United States Patent
Kalb et al.

(10) Patent No.: US 6,710,562 B1
(45) Date of Patent: Mar. 23, 2004

(54) SYNCHRONOUS MOTOR WITH AN ELECTRONIC CONTROL DEVICE FOR ADJUSTING DEVICES IN MOTOR VEHICLES AND METHOD FOR CONTROLLING THEM

(75) Inventors: Roland Kalb, Rossach (DE); Craig Kinnell, Coburg (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 13 days.

(21) Appl. No.: 10/129,465

(22) Filed: Aug. 2, 2002

(30) Foreign Application Priority Data

Nov. 2, 1999 (DE) .......................................... 199 52 572

(51) Int. Cl.⁷ .............................................. E05F 15/16
(52) U.S. Cl. ........................ 318/434; 318/286; 318/432; 318/437
(58) Field of Search .................... 318/264, 265, 318/266, 286, 432, 433, 434, 437, 466, 468, 469

(56) References Cited

U.S. PATENT DOCUMENTS

| | | |
|---|---|---|
| 4,468,596 A | 8/1984 | Kinzl et al. |
| 5,245,258 A | 9/1993 | Becker et al. |
| 6,239,610 B1 * | 5/2001 | Knecht et al. ............... 324/772 |
| 6,304,048 B1 * | 10/2001 | Davies et al. ............... 318/475 |
| 6,426,604 B1 * | 7/2002 | Ito et al. ..................... 318/466 |

FOREIGN PATENT DOCUMENTS

| | | |
|---|---|---|
| DE | 30 341 118 C2 | 3/1982 |
| DE | 40 19 787 A1 | 1/1991 |
| DE | 195 02 306 A1 | 8/1996 |
| DE | 297 07 440 U1 | 7/1997 |
| DE | 197 07 850 C1 | 3/1998 |
| DE | 198 09 628 A1 | 9/1999 |
| EP | 0 482 040 B1 | 4/1992 |
| JP | 57-78357 | 5/1982 |
| JP | 4-231 | 1/1992 |

* cited by examiner

Primary Examiner—Bentsu Ro
(74) Attorney, Agent, or Firm—Christie, Parker & Hale, LLP

(57) ABSTRACT

A method for controlling a synchronous motor driven adjustment device is used in motor vehicles by means of an electronic control, especially for controlling adjustment devices with an anti-trap protection and/or with an excess force limitation. The method includes evaluating variables correlating to the dynamics of the adjusting device or the position of the adjustment member and generating control signals based on the variables, controlling the adjustment rate of the adjustment member to a constant value, and setting a phase displacement between an exciting field and a rotating field of the motor to provide torque to the drive unit based on the load angle at which the torque reaches a maximum.

17 Claims, 3 Drawing Sheets

SYNCHRONOUS MOTOR WITH AN ELECTRONIC CONTROL DEVICE FOR ADJUSTING DEVICES IN MOTOR VEHICLES AND METHOD FOR CONTROLLING THEM

CROSS-REFERENCE TO RELATED APPLICATION

This application claims priority of International application number PCT/DE00/03864, filed Nov. 1, 2000, which in turn claims priority of German application number 199 52 572.2, filed Nov. 2, 1999.

FIELD OF INVENTION

The invention relates to a synchronous motor with an electronic control device for adjusting devices in motor vehicles, in particular for adjusting devices with trap protection and/or limitation of excess force, and to a method of controlling the motor-drive unit of the adjusting device. The drive unit according to the invention may be used particularly advantageously in conjunction with an electrically operated window regulator or a sliding roof.

BACKGROUND

A generic electronically controlled drive unit is known from EP 0 482 040 B1. It consists of a permanently excited DC motor in the form of a bar-wound armature motor which forms a structural unit with a gear and an electronic control unit. A tongue-like projection of the control unit has, at its free end, means for making electric contact with the motor and Hall-effect sensors associated with a ring magnet arranged on the motor shaft. The adjusted position of the windowpane as well as the adjustment rate can be determined from the sensor signals. If an object is trapped in the closing window gap, the resistance to adjustment increases so the interval between the succeeding signals increases. If a previously defined extent of change in speed is exceeded, the drive is stopped and the windowpane reversed.

A corresponding method of trap protection for controlling a window regulator drive is described in DE 30 34 118 C2. In that patent, the distance covered is determined electronically during the opening and closing process and the opening distance is compared with the respectively covered closing distance during the closing process. The adjustment range of the windowpane is divided into three ranges. In a first range between completely opened and about half opened, the electronic trap protection remains switched off; when a blocked state occurs, the motor is switched off after exceeding a predetermined time limit. In the following second range which ends just before the seal of the window frame, the trap protection is activated. Measured values dependent on the speed or velocity of the unit are determined here and compared with a limit based on the initial measured value. If the limit is exceeded, the controller momentarily changes over the drive and then switches it off. The trap protection is deactivated again when the closure range is reached as the windowpane could not otherwise be completely closed owing to the additional resistance of the seal.

An inadmissibly high trapping force could occur during entrapment owing to the system-dependent motor characteristic which leads to an increase in the torque during a reduction in the motor speed.

To detect entrapment, an adjusting path of the motor shaft carrying the ring magnets which is sufficient for detecting at least one further signal period after the beginning of the entrapment, the signal period being compared with the value for the preceding signal period, is required so an adjustment path of at least two signal periods must be guaranteed. Under undesirable circumstances, in particular when a hard object (for example a head) is trapped, the situation where even the maximum torque is achieved can be a considerable and may not be prevented.

SUMMARY

It is accordingly the object of the invention to provide a drive unit for adjusting devices in motor vehicles and to develop a method of controlling the drive unit which are capable of ensuring simple and reliable operation of the adjustment members. In particular, reliable detection of the trap protection and adherence to predetermined limits for the permitted trapping force are to be guaranteed even during speed control for achieving a constant adjustment speed of the adjustment member which is independent of load. In addition, a reliable approach to stop positions should be possible, without additionally distorting the adjustment system with considerable excess forces.

A sealing element which subdivides the motor into a dry space comprising the electric and electronic components and a wet space, is accordingly arranged between the stator and the rotor of the motor drive unit constructed as a synchronous motor. The conditions for the use of inexpensive designs of dry space for the electric components are therefore met. In addition, the best conditions are provided owing to the use of a synchronous motor with its system-specific properties for fulfilling the specific requirements of adjusting devices in motor vehicles. This applies, in particular, to the attainment of a constant speed of adjustment of an adjustment member as the adjustment force requirements change over the adjustment path (for example owing to varying coefficients of friction) and with respect to the compliance with comparatively low trapping forces, particularly if malfunctioning of the trap protection (for example due to vibrations or impacts during travel) is to be avoided.

To guarantee suitable starting conditions, a synchronous motor with at least two windings is used to produce at least two pairs of poles of the rotating field of which the motor speed may be controlled to a constant value via the frequency of the rotating field. The torque proposed for the adjustment movement of the adjustment member is provided via the setting of the load angle δ which is defined as phase displacement between the exciting field and the rotating field of the motor.

Preferably, the stator of the synchronous motor forms a prefabricated, pre-testable unit with the electronic control device and the connectors and optionally with the sensor device. A mechanical carrier comprises interconnecting elements which, for producing a mechanical connection to the stator, engage in the interstices thereof. To protect the electric parts of the stator from moisture, the carrier may be pot-shaped in construction so the stator is at least partially surrounded by the carrier in such a way that the carrier can act as a partition between a wet and a dry space. In this embodiment, the partition extends in the air gap between stator and rotor.

A further method of connecting the stator to the carrier and protecting it from wetness is to fasten the stator on the carrier by encapsulating the stator with a plastics material. If the carrier also consists of plastics material, the stator can be injection moulded into it. To avoid power losses, it is necessary to keep the air gap between stator and rotor as small as possible. Encapsulation of the stator which is as thin-walled as possible should therefore be provided.

The invention is particularly suitable for use in window regulators or sliding roofs, particularly if the body compartment in which the drive unit is arranged has separate wet and dry spaces. Trap protection can be detected simply and particularly reliably. as an adjustment movement of the adjustment member is not required for this purpose. Analysis of the load-dependent phase displacement between the exciting field of the rotor and the rotating field of the stator guarantees, at all times, a reliable measurement which, in conjunction with other measured values such as the adjustment position, adjustment speed and historic measured values, allows complex evaluation. If a specific excess force or maximum trapping force is predetermined, the exceeding of this force can be reliably avoided by adjusting the operating point of the synchronous motor to such a load angle $\delta_B$ before the load angle $\delta_K$ of the breakdown torque that the increase in torque $\Delta M$ between the two load angles $\delta_B$, $\delta_K$ at the adjustment member (for example windowpane) leads, to the maximum extent, to attainment of a predetermined excess or trapping force.

It is mentioned at this point that the drive according to the invention can also be used to operate seat adjusters. Similarly to window regulators, seat adjusters may be equipped with trap protection to avoid injury. As the conditions for adjusting a vehicle seat depend not only on the operating temperature, the degree of aging, the contamination etc., but also on the weight of the user, it is advisable to adjust each seat quickly and almost unnoticeably before (for example when releasing the vehicle lock) and after the occupation thereof in order to determine the prevailing constraints. The operating point can then be set according to the predetermined requirements.

One of the main requirements in adjusting devices in motor vehicles is uniform running of the drive which is a prerequisite for avoiding modulating noises. For this purpose, the speed of adjustment of the adjustment member is controlled to a constant value via the frequency of the rotating field. The torque provided for the adjustment movement of the adjustment part is set via the load angle $\delta$ which is defined as phase displacement between the exciting field and the rotating field of the motor. With varying loading of the adjustment system, the changing load angle $\delta$ is kept constant by readjusting the current. This can be effected by pulse width modulation or by a variable resistor.

There are various methods of trap protection or of approaching a stop limiting the adjustment path, the main ones of which will be described in brief hereinafter:

Method of Control With Trap Protection

The prevailing load angle $\delta_n$ is initially measured and the maximum permitted load angle $\delta_{max}$ of the subsequent phase calculated on the basis thereof, the prevailing load angle $\delta_n$ being increased by a relative value ($X\% \times \delta_n$) or an absolute value (Y degrees). A load angle $\delta_{n+1}$ is then measured at a subsequent phase n+1. The load angles $\delta_n$ and $\delta_{n+1}$ are now compared with one another. If the deviation is smaller than the value permitted on the basis of the increase (deviation between the maximum permitted load angle $\delta_{max}$ and the prevailing load angle $\delta_n$), there is no entrapment and the drive unit will continue to operate by permitting readjustment of the current. However, if the deviation is greater than the value permitted on the basis of the increase, further operation of the drive unit is permitted if the current is not readjusted.

If the exceeding of the breakdown torque of the motor is detected (which is achieved at a load angle $\delta_K=180°/N_{wind}$, $N_{wind}$ corresponding to the number of motor windings) leading to a stoppage of the motor, an entrapment is assumed. The motor is then switched off; its direction of rotation is reversed; or it continues to operate for a specific time or number of starting cycles, the motor being started up again in accordance with a proposed starting sequence control after each exceeding of the breakdown torque, and on attainment of the predetermined time or number of starting cycles, an entrapment is assumed and the motor is switched off or its direction of rotation reversed.

If, after the exceeding of the breakdown torque within the predetermined time or number of starting cycles with a current adjusted for the load angle $\delta_n$, a load angle $\delta_{n+m}$ is measured which is lower than the value permitted on the basis of the increase, a temporary disturbance not based on an entrapment is assumed, so the motor can still be operated. If a load angle is measured that is greater than the value permitted on the basis of the increase, then a continuation of the disturbance is assumed and the motor is switched off or its direction of rotation reversed once the predetermined time has been exceeded.

Method of Control for Approaching a Stop (A) A normalizing run with an established maximum torque which guarantees reliable attainment of the stop position should first be carried out. The process involves at least measuring and storing the position at which the motor stalls. The next approach of the stop position takes place from an established adjustment position in the vicinity of the stop position at a greatly reduced speed of adjustment and a reduced torque, the torque being controlled by setting the current.

The drive unit is switched off on reaching the stored stop position or on reaching a predetermined maximum torque which is lower than the maximum torque of the normalizing run when the corresponding adjustment position does not exceed a permitted distance from the stored stop position, or on reaching an adjustment position located in front of the stored stop position optionally utilising the slowing-down behaviour of the adjustment system.

(B) A further variation is also based on performance of a normalizing run with an established maximum torque and measurement and storage of the load angle $\delta_{n-1}$ dependent on the adjustment position of the adjustment member at least for a region directly adjoining the stop position, in order to determine the extent of the position-dependent sluggishness. When the stop position is next approached, the prevailing position-dependent measured values of the load angle $\delta_n$ are detected and stored. The maximum torque to be adjusted is now calculated as a function of the prevailing load angle $\delta_n$ and the load angle $\delta_{n-1}$ of the preceding adjustment movement. Operation of the drive unit with a torque which is lower than the calculated maximum torque to be adjusted guarantees a mode of operation which protects the system.

It may be sufficient for various applications, however, if the rotating field frequency and the electric current are reduced for approaching a stop position. The drive unit is switched off when the thus reduced breakdown torque is exceeded. It is obviously also possible to switch off the drive unit just before the stop position is reached, thus avoiding additional distortion of the system.

As very low trapping forces can be reliably adjusted with the invention without an adjustment path of the adjustment member being required for entrapment detection, the existence of entrapment must not be assumed, for safety reasons, during a stoppage of the motor due to external influences. Therefore, it is quite possible and sensible to start the motor again or repeatedly using a starting sequence control, to check whether it is a transient event which led to stoppage of the motor. A starting sequence control should be used here to minimize the starting time.

It is thus possible to avoid spurious tripping of trap protection, for example due to vertical acceleration forces when passing over a so-called rough track.

A particular advantage can be that the operating point of the motor of each individual adjusting device can easily be set automatically during a normalizing run by means of the electronic control device. This occurs whenever a predetermined permitted deviation is exceeded. The permitted deviation can be obtained, in particular, from the difference between the smallest load angle $\delta_{min}$ within the monitored range of an adjustment movement and the load angle $\delta_K$ of the breakdown torque at which a torque difference $\Delta M$ is set, which is capable of producing the maximum permitted adjustment force on the adjustment member.

BRIEF DESCRIPTION OF THE DRAWINGS

The invention will be described in more detail hereinafter with reference to an embodiment illustrated in the accompanying drawings, in which.

DETAILED DESCRIPTION OF THE PREFERRED EMBODIMENTS

Figure 1:
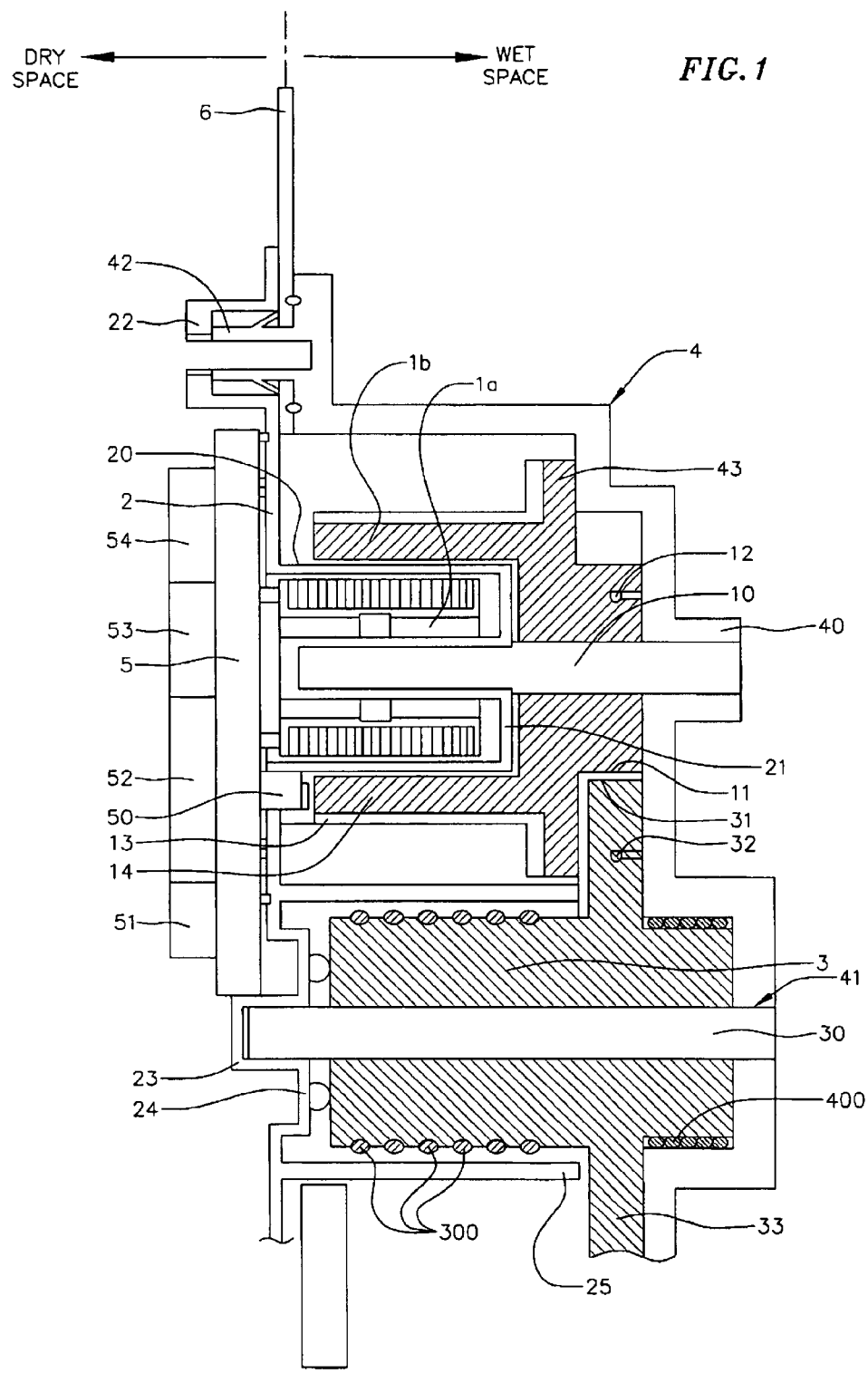
FIG. 1 is a schematic section of a drive unit with external rotor motor and electronic control unit, the electrical and electronic components being separated from the wet space by the wall of a carrier.

The cross-sectional view in FIG. 1 shows a drive unit for an electrically operated window regulator of a vehicle door which is subdivided into a wet space and a dry space by a wall 6. In this embodiment, the drive unit consisting of an external rotor motor 1a, 1b, a mechanical gear 11, 25, 30, 31 and an electronic control unit 5 is equipped with an assembly carrier 2 which forms a boundary, drawn through the motor, between wet and dry spaces. The assembly carrier 2 has a cylindrical region 20 which is closed by an end_face region 21 with the stator 1a of the external rotor motor arranged in its cavity. The stator 1a is rigidly connected to the assembly carrier 2 or a base plate (not shown) of the electronic control unit 5. This allows direct electrical contact with the stator 1a to be made via the control unit 5 which also carries the sensor device 5 and the connectors 51 to 54.

The assembly carrier 2 also comprises at least one fastening region 22 with adjustment means in which the fastening and adjustment means 42 of the wet space-side crown 4 engage through an aperture in the wall 6. Preassembly means 12 which can be clipped into suitable interlocking elements of the rotor 1b are integrated in the crown 4 to form a preassembly module. At the same time, the previously assembled cable drum 3 surrounded by the cable 300 is supported in its preassembled position via the nesting of the rings 33, 43. The shaft 30 centres the cable drum 3 on the one hand via the radial bearing 41 in the crown 4 and on the other hand via the radial bearing 23 integrated in the assembly carrier 2. A thrust bearing 24 holds the cable drum 3 in the drive unit without play.

To guarantee optimum concentricity of the motor, stator 1a and rotor 1b are mutually centered via a common shaft 10 near a radial bearing 40, without the shaft 10 penetrating the partition between wet and dry space formed by the assembly carrier 2. Owing to the consequent separation of the stator 1a and the rotor 1b, there are no sealing regions which move relative to one another.

In this embodiment, force is transmitted via the pinion teeth 11, 31. With this non-self-locking gear it is necessary to support the torques occurring at the output end via a brake 400 or a silent ratchet (not shown).

A magnetoresistive sensor 50 is placed opposite the end face of the permanent magnet 14 of the rotor 1b near the metal housing 13 on the electronic control device 5 for speed detection and calculation of the adjustment position. The signal concerning the direction of rotation can be inferred from the control signal so clear allocation of the sensor signal to one of the two directions of rotation is guaranteed.

Figure 2:
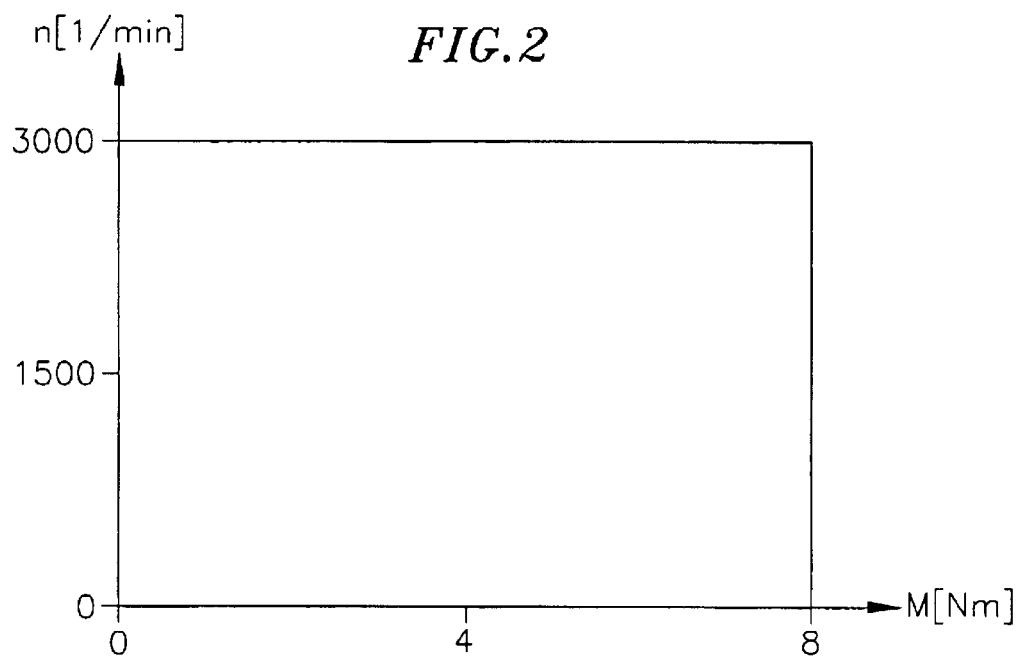
FIG. 2 is a graph of speed and torque showing the motor characteristic of one embodiment according to the invention.
Figure 3:
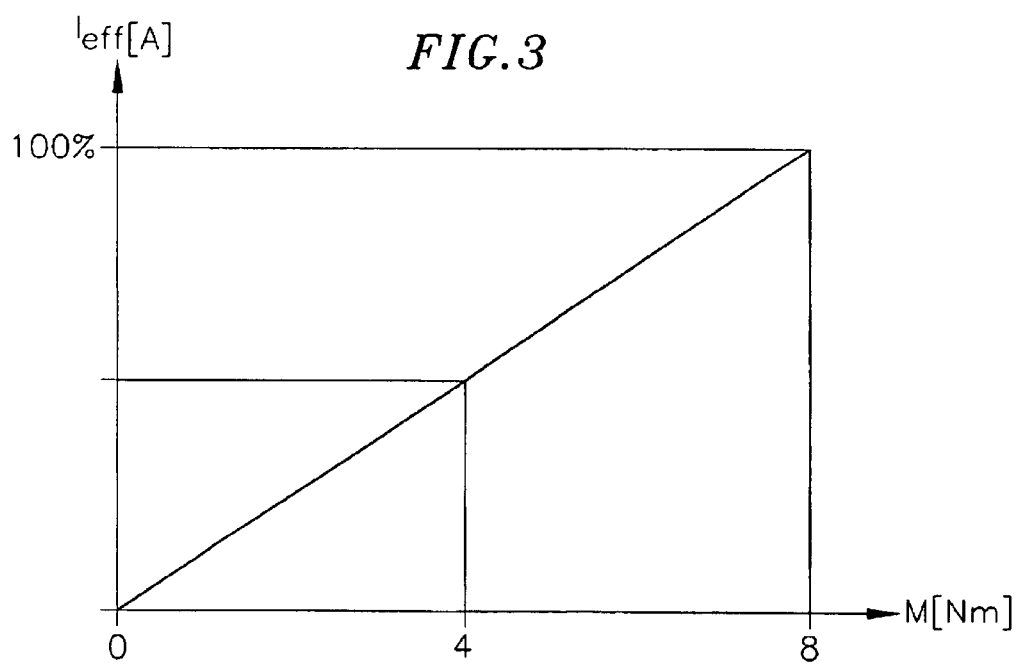
FIG. 3 is a graph of current and torque showing the motor characteristic of one embodiment according to the invention.

FIG. 2 shows the dependency between the speed n of a synchronous motor and the torque M. The speed set via the rotating field accordingly remains constant providing the breakdown torque is not achieved and the motor is stalled. The torque M can be adapted via the current I to the load applied to the motor. There is a proportional relationship between the effective current $I_{eff}$ and the torque M of the motor, as shown in FIG. 3.

Figure 4:
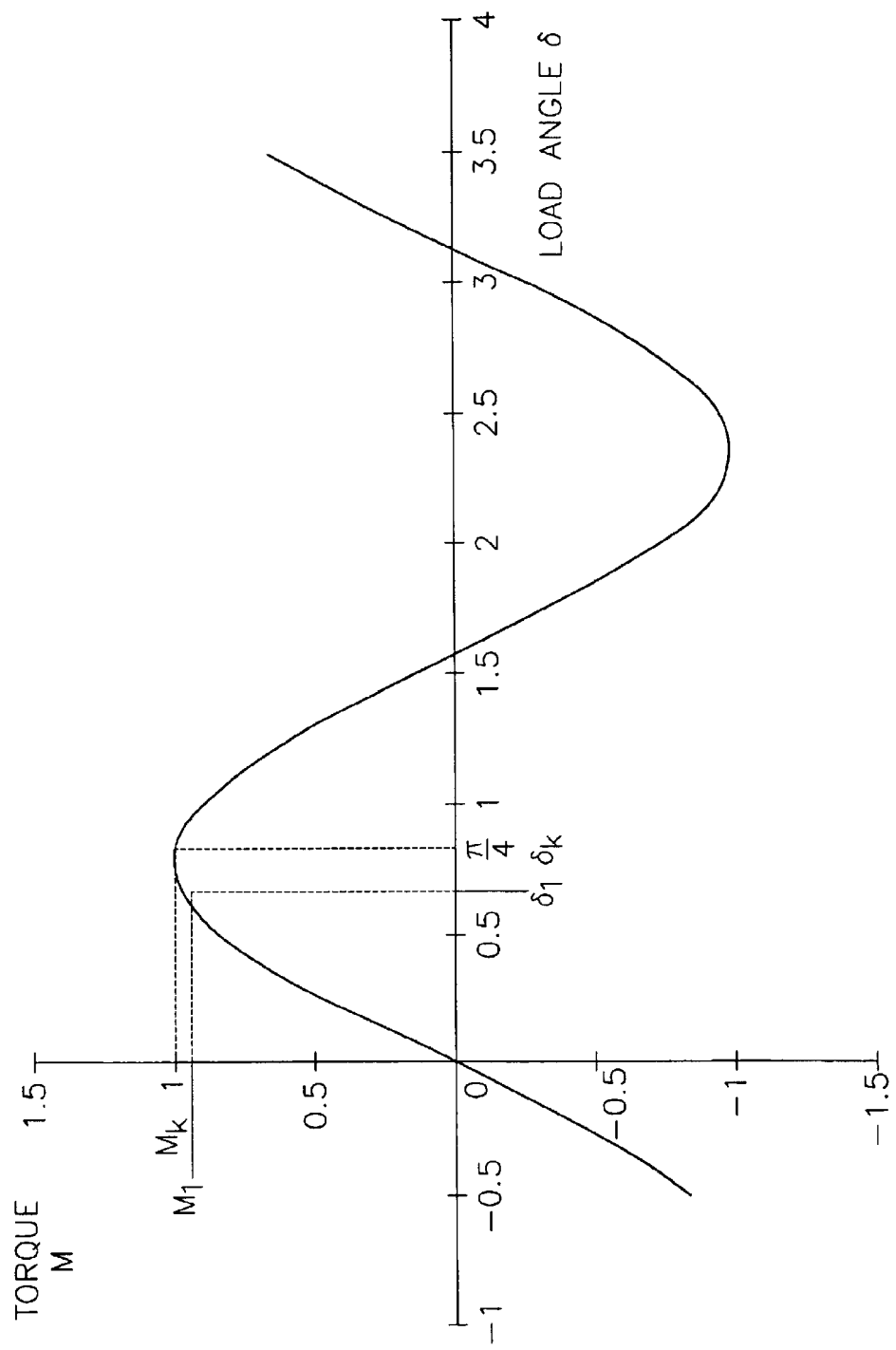
FIG. 4 is a graph of torque and load angle showing the motor characteristic of one embodiment according to the invention.

FIG. 4 shows the sinusoidal characteristic of the synchronous motor, the torque M being plotted over the load angle $\delta$. The drive range of the motor extends over a maximum of $\pi/4$, and this corresponds to a load angle of 90° and therefore the so-called tilting angle $\delta_K$, at which the torque M reaches its maximum value, namely the so-called breakdown torque $M_K$.

To guarantee stable running of the motor, the operating point of the motor is established over a load angle $\delta_1$ which is adequately spaced from the load angle $\delta_K$ (90°) of the breakdown torque $M_K$. The interval between the torque $M_1$ of the operating point and the breakdown torque $M_K$ is also established by setting the load angle $\delta_1$. A force which is applied to the adjustment member and corresponds to the maximum entrapment force or excess force is obtained from the difference between these two moments $M_1$, $M_K$. Therefore, the maximum permitted entrapment force of the adjustment member can easily and reliably be set and the exceeding thereof can reliably be prevented when using a synchronous motor. Different requirements concerning the sensitivity can also be satisfied by varying the load angle, for example to avoid incorrect reversal of a windowpane when travelling over a rough track. For this purpose, the vibrations and impact affecting the vehicle body can be measured and evaluated, for example, by a sensor device. Depending on the measured results, the load angle of the operating point is then reduced by an appropriate value.

One or more of the following advantages can be advanced with such use of a synchronous motor in adjusting devices for motor vehicles:

simple speed control reliable detection of trap protection by evaluation of the load angle, without the need for an adjusting movement of the adjustment member reliable limitation of entrapment force and excess force by corresponding setting of a limited angle difference between load angle and tilt angle no commutation noises low spurious electromagnetic radiation good facilities for integration of all electrical and electronic components of the drive unit facility for consequent separation of wet and dry space right through the motor without the need for a seal between parts which move or rotate relative to one another drive unit may be subdivided into a substructure comprising the electrical and electronic components and a substructure comprising the gear and the rotor of the motor.

What is claimed is:

1. A method of controlling a motor-driven adjusting device for an adjustment member in a motor vehicle by means of an electronic control device, comprising:

detecting and evaluating measured variables or signals correlated with the dynamics of the adjusting device, and if necessary with a position of the adjustment member in order to generate control signals;

controlling a rate of adjustment of the adjustment member to a constant value based on a frequency of a rotating field of a motor drive unit constructed as a synchronous motor; and setting a load angle with respect to a tilt angle to provide drive unit torque for adjustment movement of the adjustment member, wherein the load angle is a phase displacement between an exciting field and the rotating field of the synchronous motor, and wherein the tilt angle is a load angle at which torque reaches a maximum.

2. The method of claim 1, further comprising readjusting the current to keep constant the load angle which changes as a load of said adjusting device varies.

3. The method according to claim 2, wherein the step of readjusting includes modulating a pulse width.

4. The method according to claim 2, wherein the step of readjusting includes providing a variable resistor.

5. The method according to claim 1, further comprising providing trap protection, the trap protection including setting an operating point of the synchronous motor at such a load angle before the tilt angle of a breakdown torque that an increase in torque between the load angle and the tilt angle at the adjustment member leads at a maximum to attainment of a predetermined excess force.

6. The method according to claim 1, further comprising providing trap protection, the trap protection comprising:

measuring a prevailing load angle;

predicting a maximum permitted load angle of a subsequent phase by increasing the prevailing load angle by one of a relative value and an absolute value;

determining whether a current readjustment is permitted based on a comparison of the prevailing load angle and the maximum permitted load angle, the step of determining comprising:

if a deviation between the prevailing load angle and the maximum permitted load angle is smaller than a value permitted on the basis of the step of predicting, there is no entrapment and readjustment of the current is permitted; and if the deviation is greater than the value permitted on the basis of the step of predicting, further operation of the motor drive unit is permitted only in the absence of readjustment of the current;

if the load angle is equal to 180° divided by a number of motor windings, leading to a stoppage of the synchronous motor, exceeding of a breakdown torque of the synchronous motor is achieved, and one of entrapment is assumed and one of the synchronous motor is switched off and the direction of rotation of the synchronous motor is reversed; and the synchronous motor continues to operate for one of a specific time and a number of starting cycles, the motor being started up again in accordance with a proposed starting sequence control after each exceeding of the breakdown torque;

assuming an entrapment and one of switching off the synchronous motor and reversing a direction of rotation of the synchronous motor if one of a predetermined time and number of starting cycles is attained;

measuring a load angle $\delta_{n+m}$ if the breakdown torque is exceeded within one of the predetermined time and number of starting cycles with a current adjusted for a load angle $\delta_n$;

if $\delta_{n+m}$ is lower than the value permitted on the basis of the step of predicting, a temporary disturbance not based on an entrapment is assumed, so the synchronous motor can still be operated; and if $\delta_{n+m}$ is greater than the value permitted on the basis of the step of predicting, then a cessation of a disturbance is assumed and one of the synchronous motor is switched off and the direction of rotation is reversed once the predetermined time has been exceeded.

7. The method according to claim 1, further comprising approaching a stop position limiting the adjustment path, the step of approaching comprising:

if no corresponding data has been stored in memory of the electronic control device, performing a normalizing run with an established maximum torque and measurement and storage of the stop position at which the synchronous motor stalls;

operation of a drive unit when the stop position is next approached from an established adjustment position in the vicinity of the stop position with reduced torque and greatly reduced speed, the torque being controlled by setting a current;

switching off the drive unit on one of reaching the stored stop position, reaching a predetermined maximum torque which is lower than the established maximum torque when a corresponding adjustment position does not exceed a permitted distance from the stored stop position, and reaching an adjustment position located in front of the stored stop position optionally using slowing-down behavior of the adjusting device.

8. The method according to claim 1, further comprising approaching a stop position limiting the adjustment path, the step of approaching comprising:

performing a normalizing run with an established maximum torque and measurement and storage of a load angle $\delta_{n-1}$ dependent on the adjustment position of the adjustment member at least for a region directly adjoining the stop position, in order to determine the extent of position-dependent sluggishness;

measuring a prevailing position-dependent load angle $\delta_n$ when the stop position is next approached and storing the measured prevailing load angle $\delta_n$;

calculating a maximum torque to be set, as a function of the prevailing load angle $\delta_n$ and of the load angle $\delta_{n-1}$ of the preceding adjustment movement; and operating a drive unit from an established adjustment position in the vicinity of the stop position with a torque which is lower than the calculated maximum torque to be adjusted, the torque being controlled by setting the current.

9. The method according to claim 1, wherein for approaching a lower stop position of a window regulator, the frequency of the rotating field is reduced.

10. The method according to claim 9, wherein a drive unit is switched off when a reduced breakdown torque is exceeded.

11. The method according to claim 10, wherein the drive unit is switched off just before reaching the stop position.

12. The method according to claim 1, wherein the synchronous motor is converted from a stopped to an operating state by a starting sequence control which takes a sum of all inert masses of the adjusting device into consideration to minimize a starting time.

13. The method according to claim 1, wherein a starting sequence control of a synchronous motor from a stopped state is effected in such a way that, depending on a position of the adjustment member a maximum torque which may be supplied is limited to various values by setting the load angle with the aim of restricting excess force in a starting phase of the synchronous motor.

14. The method according to claim 1, wherein a starting sequence control is activated automatically for one of a certain time and a predetermined number of starting cycles after a stoppage of the synchronous motor due to external influences.

15. The method according to claim 1, wherein an operating point of the synchronous motor of the adjusting device is set automatically during a normalizing run by means of the electronic control device.

16. The method according to claim 15, wherein the operating point of the synchronous motor is adapted automatically to changed conditions when a predetermined permitted deviation is exceeded.

17. The method according to claim 16, wherein the predetermined permitted deviation is obtained from the difference between a smallest load angle within a monitored range of an adjustment movement and a load angle of a breakdown torque at which a torque difference is set, the load angle of the breakdown torque capable of producing the maximum Permitted adjustment force on the adjustment member.

* * * * *